United States Patent [19]

Shirouchi et al.

[11] Patent Number: 5,498,399

[45] Date of Patent: Mar. 12, 1996

[54] PROCESS FOR REMOVING NITROGEN OXIDES

[75] Inventors: Shoji Shirouchi; Takeshi Sugiyama; Kouichi Morioka, all of Kakogawa, Japan

[73] Assignee: Kabushiki Kaisha Kobe Seiko Sho, Kobe, Japan

[21] Appl. No.: 283,741

[22] Filed: Aug. 1, 1994

Related U.S. Application Data

[62] Division of Ser. No. 86,204, Jul. 6, 1993, Pat. No. 5,366,950.

[30] Foreign Application Priority Data

Jul. 6, 1992 [JP] Japan ................................. 4-178442

[51] Int. Cl.$^6$ .................................................... C01B 21/00
[52] U.S. Cl. ................................... 423/239.1; 423/210.5
[58] Field of Search ............................ 423/239.1, 210.5, 423/DIG. 12; 588/201

[56] References Cited

U.S. PATENT DOCUMENTS

4,011,299  3/1977  Henis et al. ........................ 423/239
5,124,305  6/1992  Muan et al. ........................ 502/338

Primary Examiner—Gary P. Straub
Assistant Examiner—Thomas G. Dunn, Jr.
Attorney, Agent, or Firm—Oblon, Spivak, McClelland, Maier & Neustadt

[57] ABSTRACT

Disclosed herein are an inexpensive catalyst for removing nitrogen oxides effectively from an exhaust gas by either catalytic reduction or catalytic decomposition, and a process for removing nitrogen oxides from an exhaust gas by the aid of said catalyst. The invention will eliminate the disadvantages—high material cost and complex process for catalyst preparation—involved in the conventional technology. The catalyst contains as the major constituent a multiple oxide of the CaO—Fe$_x$O type containing 5–50 wt % CaO, said catalyst reducing or decomposing nitrogen oxides. The process is designed for denitration of nitrogen oxides by the aid of said catalyst.

11 Claims, 11 Drawing Sheets

CATALYTIC REDUCTION

FIG. 9

CATALYTIC DECOMPOSITION

FIG. 10

PROCESS FOR REMOVING NITROGEN OXIDES

This is a division, of application Ser. No. 08/086,204, filed on Jul. 6, 1993 now U.S. Pat. No. 5,366,950.

BACKGROUND OF THE INVENTION

1. Field of the Invention

The present invention relates to a catalyst for removing nitrogen oxides from a combustion exhaust gas (such as the one from a sintering machine). More particularly, the present invention relates to a catalyst for removing nitrogen oxides from a combustion exhaust gas by reduction or decomposition. (The catalyst promotes reduction by a reducing agent which is originally present in an exhaust gas or is added to an exhaust gas afterward. The catalyst also performs catalytic decomposition by itself.) The present invention also relates to a process for removing nitrogen oxides from an exhaust gas by the aid of said catalyst.

2. Description of the Prior Art

One of the most important problems associated with air pollution is the removal of nitrogen oxides.

There are several means to remove nitrogen oxides from exhaust gases. They are broadly classified as (1) denitration by catalytic reduction, (2) denitration by catalytic decomposition, (3) denitration without catalysts, and (4) denitration by electron beam irradiation. The first two are generally preferred because of low operation cost and high performance.

Exhaust gas from a sintering machine needs the reduction of nitrogen oxides. This object is usually achieved by denitration with a special equipment attached to the sintering machine. Other means to this end include "exhaust gas recycling" to control fuel combustion (as disclosed in Japanese Patent Laid-open No. 70008/1978) and "multi-stage charging" (as disclosed in Japanese Patent Laid-open No. 80202/1979). These technologies have the disadvantage of requiring an additional equipment for denitration, exhaust gas recycling, or multi-stage charging. On the other hand, an attempt has been made to carry out denitration by mixing an exhaust gas with a substance, such as an ammonium compound, as disclosed in Japanese Patent Laid-open No. 82304/1979. This attempt, however, is not successful because of the possibility of ammonia leaking from the system to cause another environmental pollution and the difficulties of process control. Now, the "scale charging process" as disclosed in Japanese Patent Laid-open No. 53704/1977" is attracting attention from the standpoint of environmental safety and high denitrating performance. To improve this technology, the present inventors paid their attention to denitration with a catalyst.

SUMMARY OF THE INVENTION

The conventional catalysts for denitration are based mostly on noble metals, and hence they are expensive per se and need to be supported on a carrier by a complex process. Therefore, they are not generally used in the field of air pollution control.

In view of the foregoing, the present invention was completed to eliminate the disadvantages—high material cost and complex process for catalyst preparation—involved in the conventional technology. It is an object of the present invention to provide an inexpensive catalyst for removing nitrogen oxides effectively from an exhaust gas by either catalytic reduction or catalytic decomposition. It is another object of the present invention to provide a process for removing nitrogen oxides from an exhaust gas by the aid of said catalyst.

DESCRIPTION OF THE PREFERRED EMBODIMENTS

According to the present invention, the catalyst for removing nitrogen oxides should be composed mainly of a multiple oxide of the CaO—$Fe_xO$ type containing 5–50 wt % CaO. It promotes the removal of nitrogen oxides from an exhaust gas by reduction with a reducing agent which originally exists therein or is added thereto afterward. It also removes nitrogen oxides from an exhaust gas by decomposition. According to the present invention, the removal of nitrogen oxides from an exhaust gas is accomplished by reduction or decomposition by the aid of said catalyst.

According to the present invention, the catalyst should be composed mainly of a multiple oxide of the CaO—$Fe_xO$ type containing 5–50 wt % CaO as an essential ingredient. With a CaO content lower or higher than specified above, the catalyst will be not effective. $Fe_xO$ in the multiple oxide CaO—$Fe_xO$ may be in any form of FeO, $Fe_3O_4$ ($FeO.Fe_2O_3$), or $Fe_2O_3$; however, it should preferably have an atomic ratio of Fe/O in the range of 0.67 to 1.00.

The functions and effects of the present invention will be described with reference to the following experimental results.

Figure 1:
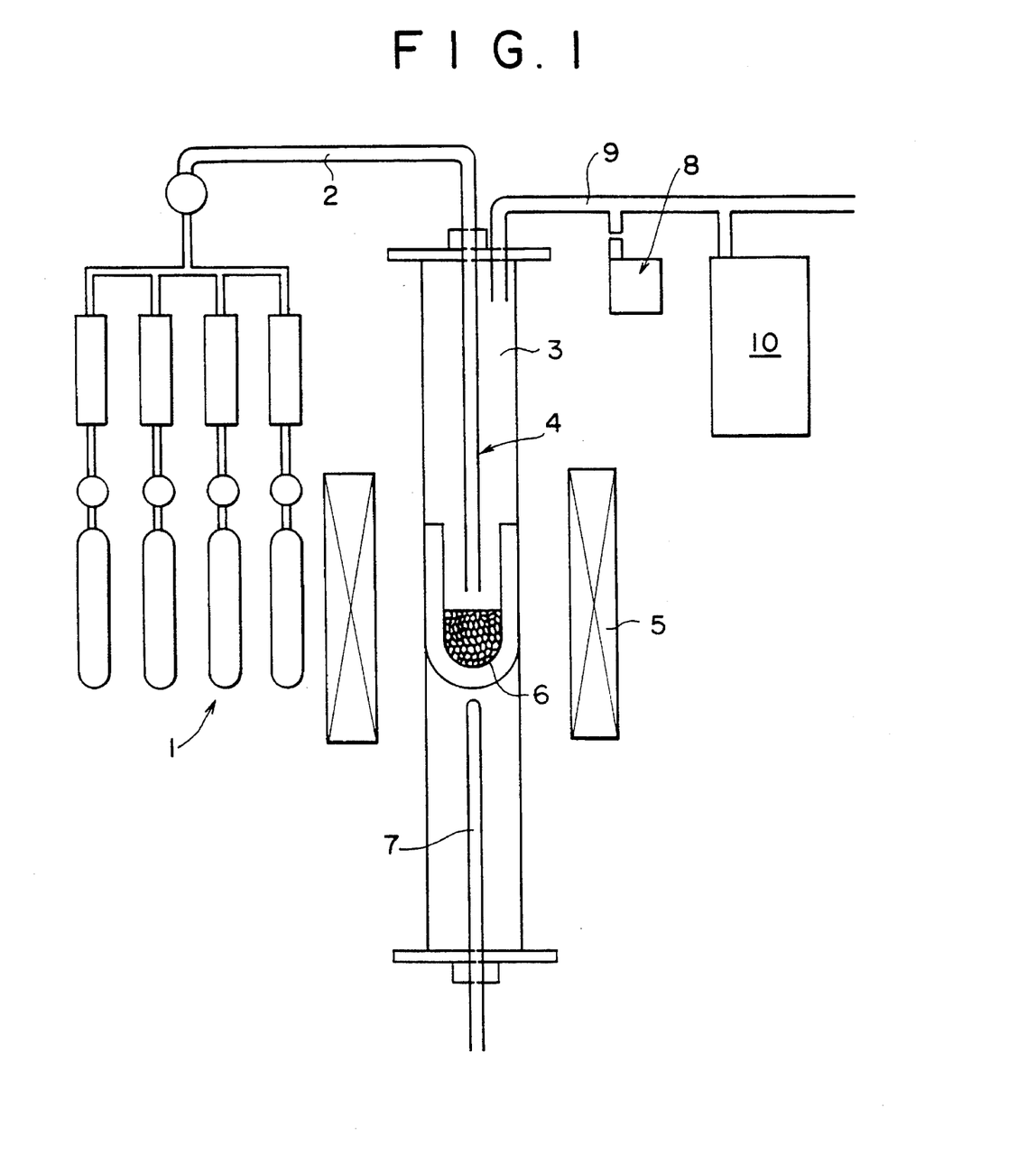
FIG. 1 is a schematic representation of the experimental apparatus used in the present invention.

FIG. 1 is a schematic representation of the apparatus used for experiments. There is shown a nitrogen oxides-containing gas generator (1), in which nitrogen oxides, carrier gas, optional reducing gas, etc. are mixed in a prescribed ratio. The thus prepared nitrogen oxides-containing gas passes through a conduit tube (2) to enter a sealed tube (crucible) (3). The gas jets out from the nozzle (4) and comes into contact with a catalyst (6) heated to a prescribed temperature by a heater (5). The temperature of the catalyst is monitored by a thermocouple (7). In the case where it is necessary to test the catalyst for ability to promote reduction, the nitrogen oxides-containing gas should be incorporated with a reducing agent such as ammonia, carbon monoxide, and RX gas. After reduction or decomposition by the catalyst (6), the resulting gas is discharged through a conduit tube (9). It is partly caught by a gas sampling bag (8) and the remainder is tested for the concentration of nitrogen oxides by an analyzer (10). Tables 1 to 3 show the experimental conditions, the gas composition, and the catalyst composition, respectively.

TABLE 1

| Crucible diameter | 24 mm |
|---|---|
| Glass flow rate | 2 N L/min |
| Nozzle diameter | 4 mm |
| Crucible material | 99.9% $Al_2O_3$ |
| Calcium ferrtie | 10 g |

TABLE 2

| Type of reaction | Gas composition | |
|---|---|---|
| Catalytic reduction | ● | 360 ppm · NO - 2.5% CO - 7.5% $CO_2$—Ar |
| | ▲ | 360 ppm · NO - 5.0% CO - 5.0% $CO_2$—Ar |
| | ■ | 360 ppm · NO - 7.5% CO - 2.5% $CO_2$—Ar |
| Catalytic decomposition | | 400 ppm · NO—Ar |

TABLE 3

| Sample | CaO content | Iron oxide | Value of x in $Fe_xO$ |
|---|---|---|---|
| C-W | 25% | FeO | 1.00 |
| C-M | 25% | $Fe_3O_4$ | 0.75 |
| C-H | 25% | $Fe_2O_3$ | 0.67 |

The catalyst used in the experiment was prepared by fusing CaO and an iron oxide specified in Table 3. It was used in the pore-free state.

The experimental results are shown in FIGS. 2 to 5. The ratio of denitration (EL%) was calculated as follows from the amount of NO ($C_{NO}^{in}$) charged and the amount of NO ($C_{NO}^{out}$) discharged.

EL%=[($C_{NO}^{in}$−$C_{NO}^{out}$)÷$C_{NO}^{in}$]×100

Figure 2:
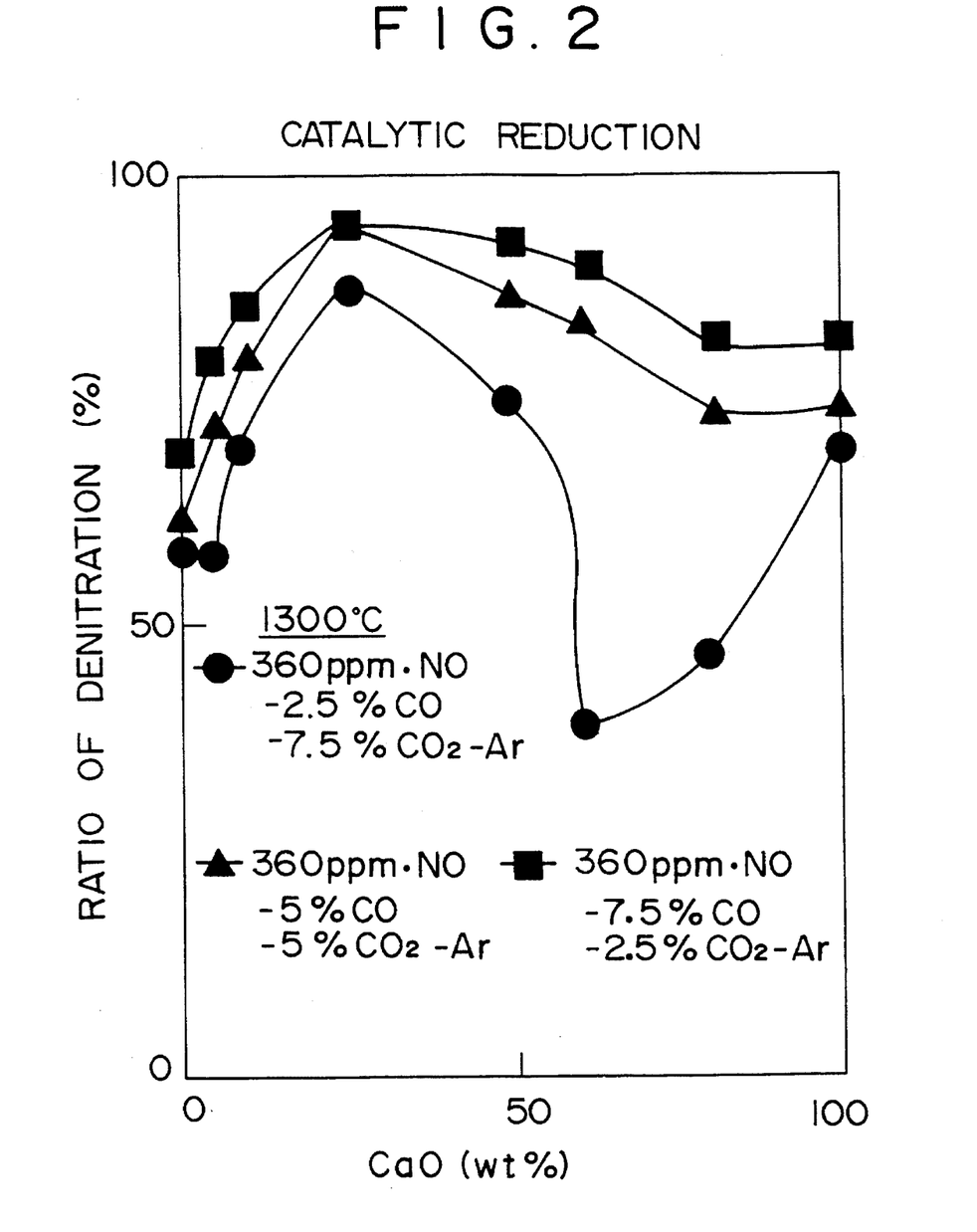
FIG. 2 is a graph showing the relationship between the ratio of denitration and the concentration of CaO (in catalytic reduction).
Figure 3:
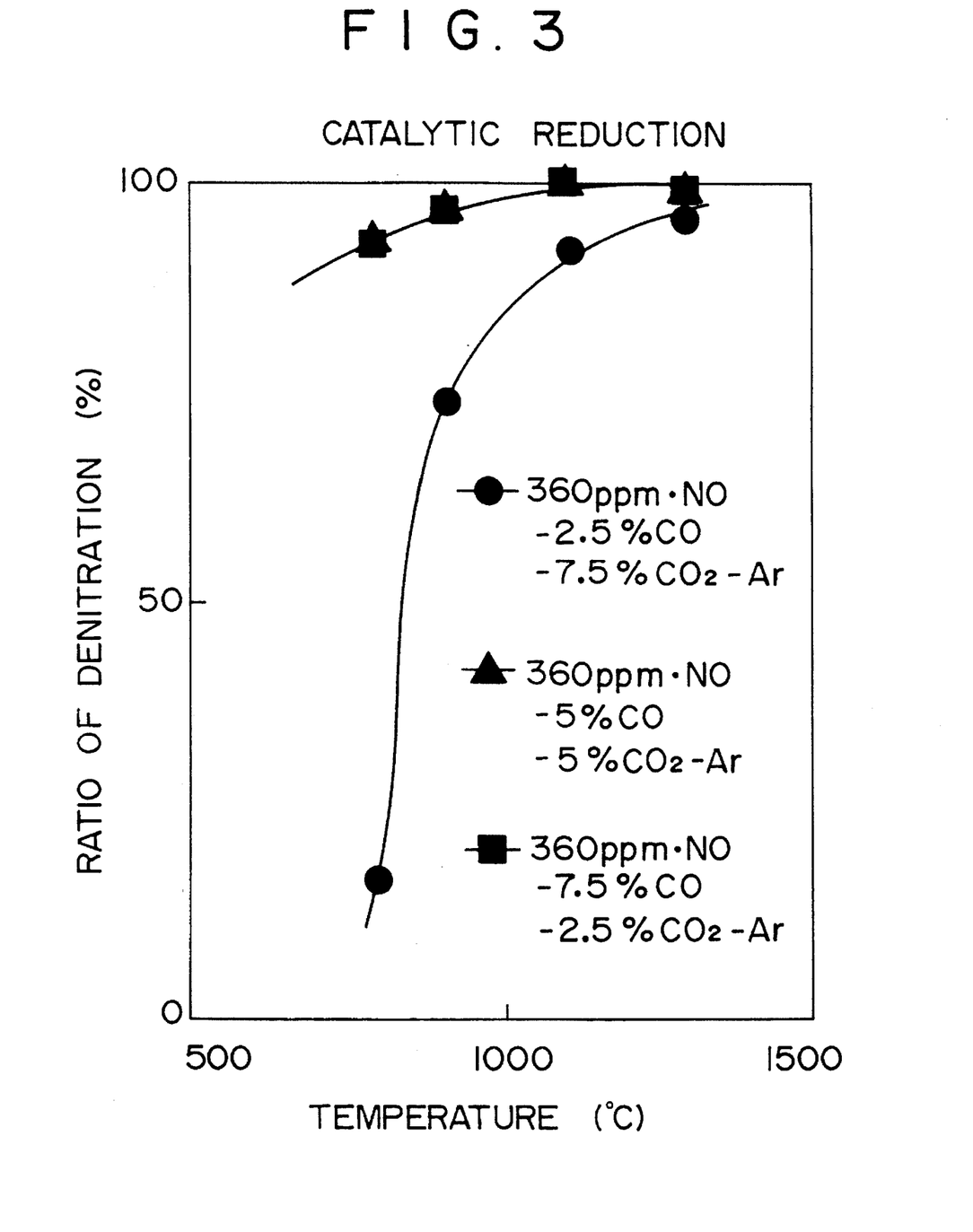
FIG. 3 is a graph showing the relationship between the reaction temperature and the ratio of denitration (in catalytic reduction).

FIGS. 2 and 3 show the ratio of denitration by catalytic reduction with CaO—FeO as an example of the catalyst. It is noted from FIG. 2 that the high ratio of denitration is achieved when the CaO content is in the range of 5–50%, especially in the neighborhood of 25%. It is noted from FIG. 3 that the high ratio of denitration is achieved when the reaction temperature is higher than 800° C. if the $CO/CO_2$ ratio is lower than 0.6. (A sufficiently high ratio of denitration is achieved even at 500° C. if the $CO/CO_2$ ratio is higher than 0.6.) Incidentally, it is amazing that the catalyst remains effective even in its molten state at a high temperature.

Figure 4:
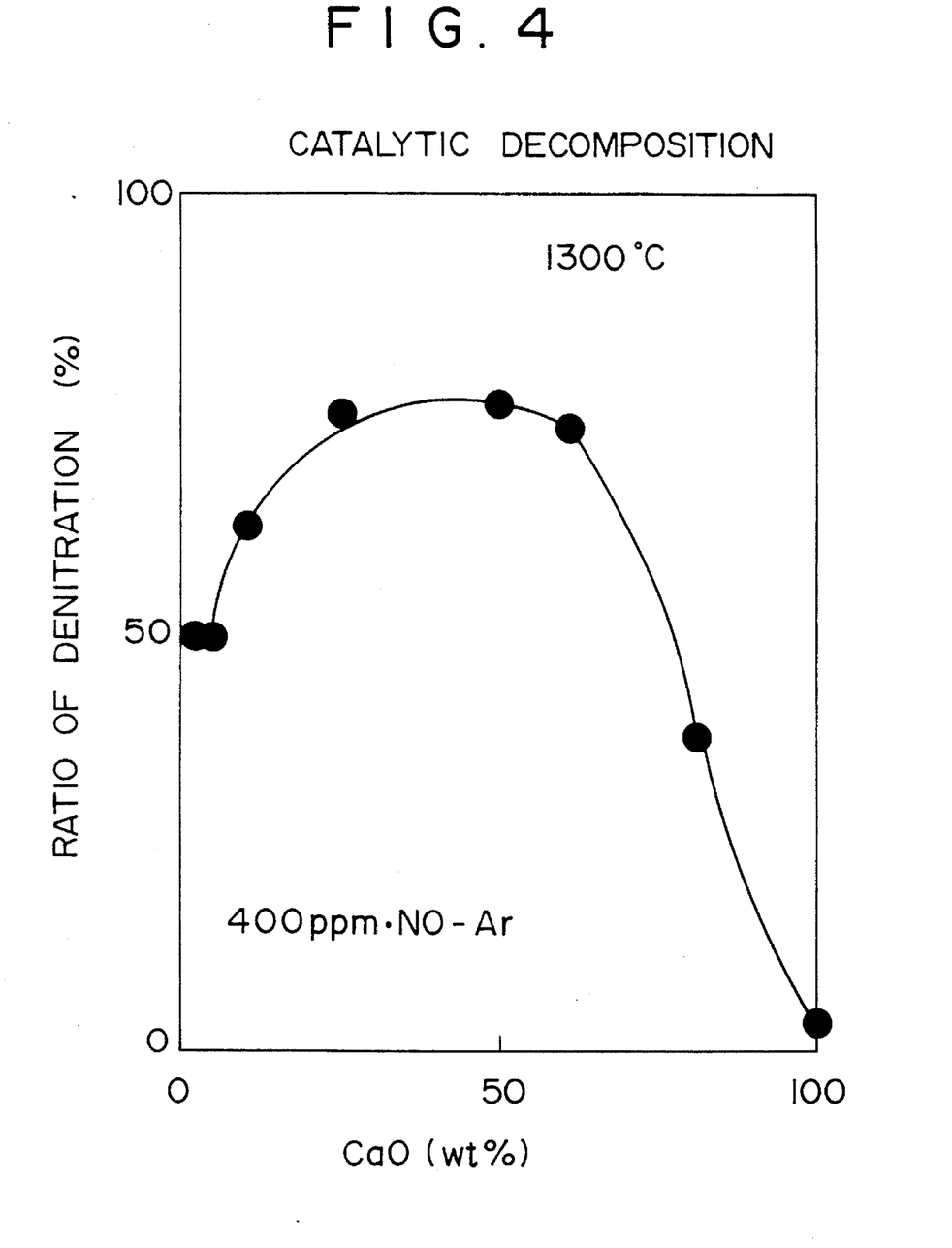
FIG. 4 is a graph showing the relationship between the ratio of denitration and the concentration of CaO (in catalytic decomposition).
Figure 5:
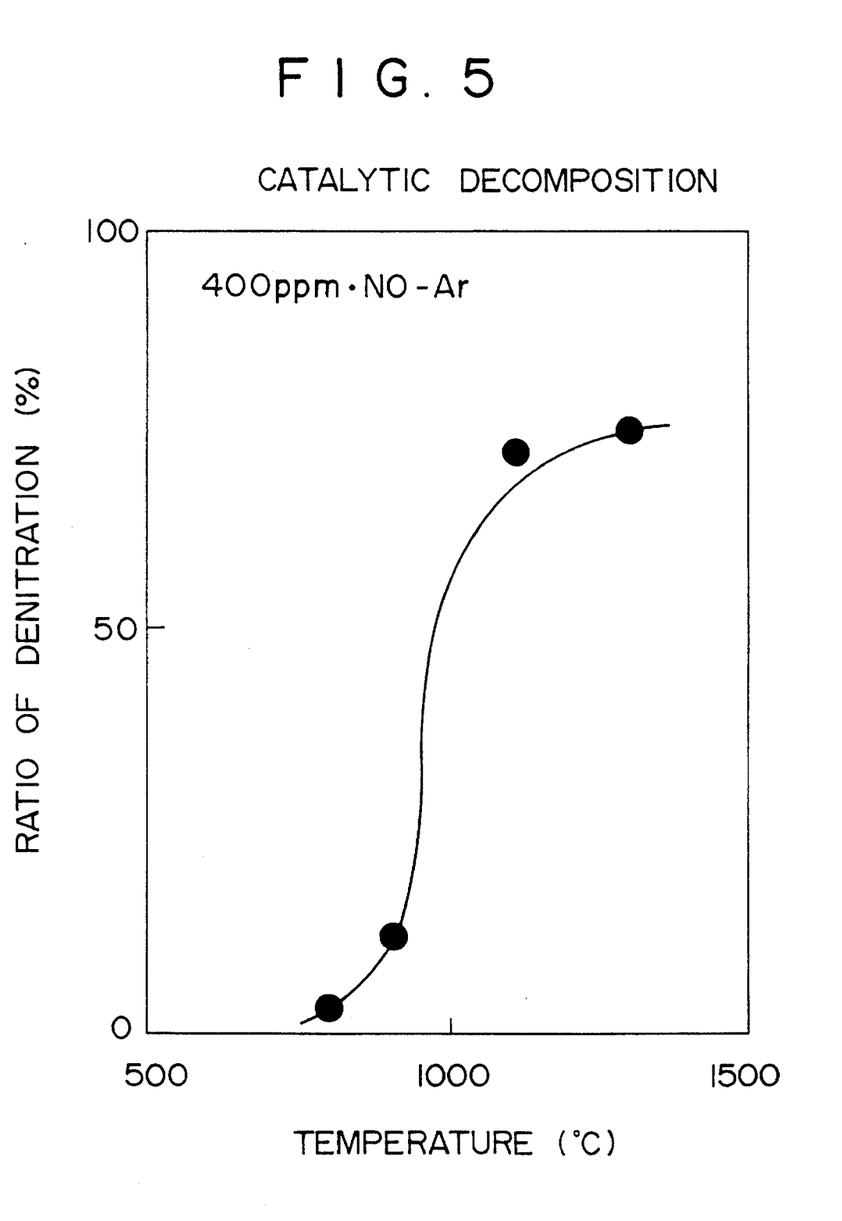
FIG. 5 is a graph showing the relationship between the reaction temperature and the ratio of denitration (in catalytic decomposition).

FIGS. 4 and 5 show the ratio of denitration by catalytic decomposition with CaO—FeO as an example of the catalyst. It also varies depending on the CaO content and reaction temperature as mentioned above. In other words, it is noted from FIG. 4 that if the CaO content is 5–50 wt %, the ratio of denitration is high, but otherwise it is low. It is also noted from FIG. 5 that the high ratio of denitration is achieved when the reaction temperature is higher than 900° C.

Figure 6:
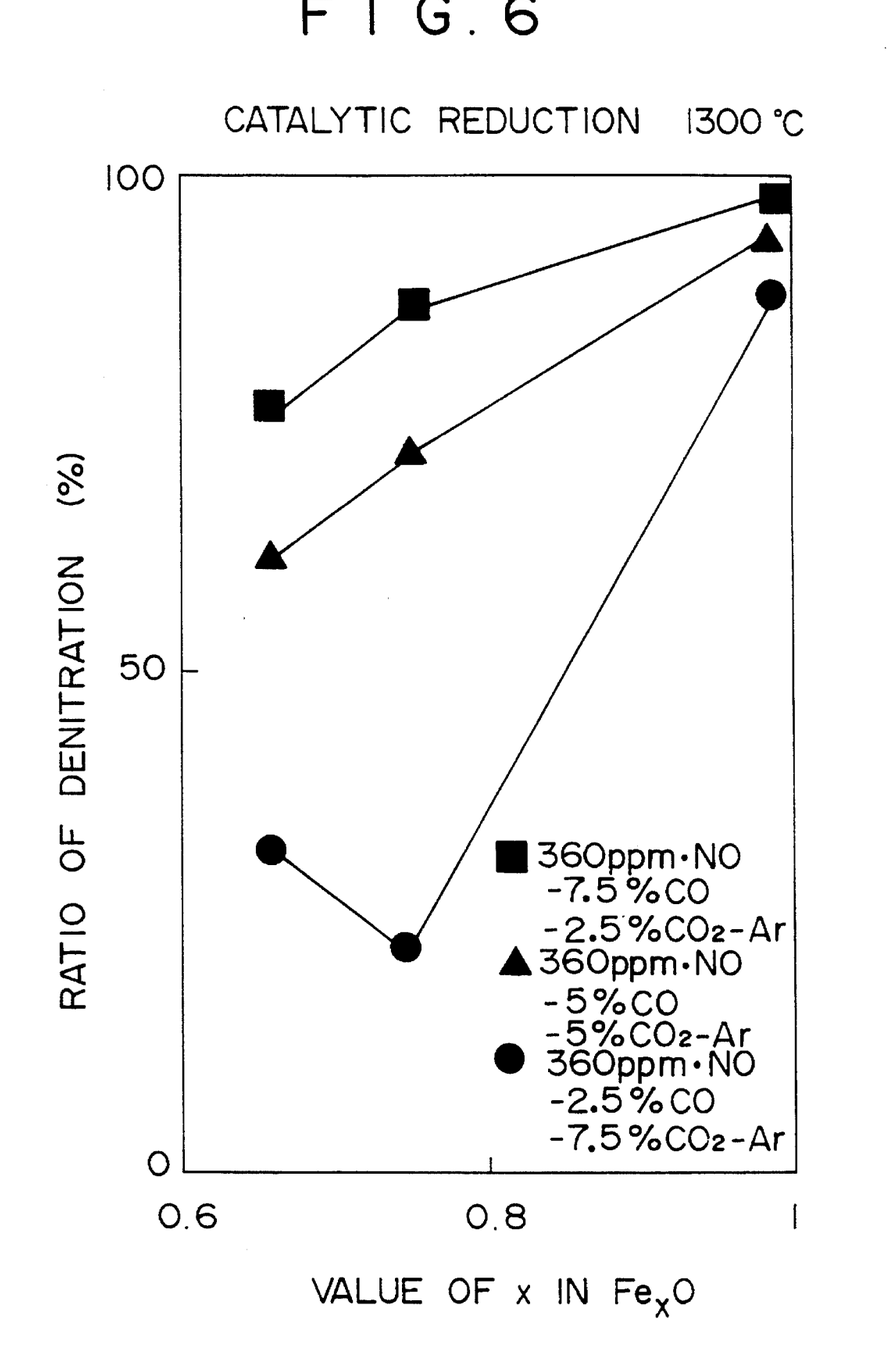
FIG. 6 is a graph showing the relationship between the value of x in $Fe_xO$ and the ratio of denitration (in catalytic reduction).
Figure 7:
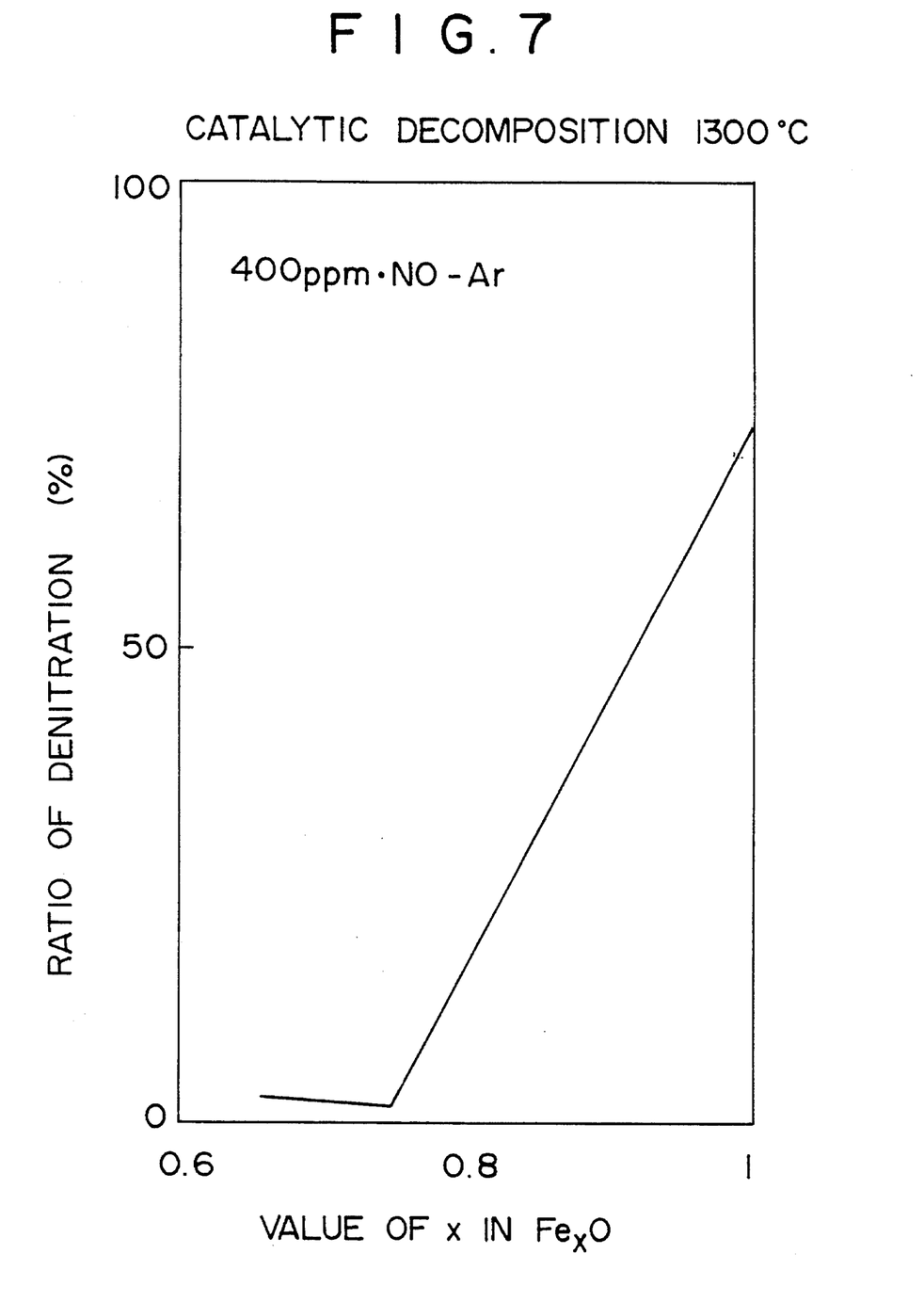
FIG. 7 is a graph showing the relationship between the value of x in $Fe_xO$ and the ratio of denitration (in catalytic decomposition).

Experiments were carried out under the same conditions as shown in FIG. 1 and Tables 1 and 2 (at 1300° C.) to see how the catalyst varies in denitrating capability depending on the degree of oxidation of the calcium ferrite. FIGS. 6 and 7 show the results of catalytic reduction and catalytic decomposition, respectively. It is noted that the maximum ratio of denitration is achieved when x=1 (FeO) in either cases. Although good results are obtained in catalytic reduction even though the value of x is low ($Fe_2O_3$) so long as the $CO/CO_2$ ratio is high, it is desirable that the value of x be in the range of 0.67–1.00 for catalytic reduction and in the higher range of 0.9–1.0 for catalytic decomposition. Incidentally, the ratio of denitration shown in FIG. 7 will be greatly improved if the reaction area is increased. For this reason, it is desirable from the standpoint of industrial production that the catalyst be formed in lumps of proper size from fine powder. The catalyst becomes more effective as the reaction temperature increases, and it is effective even when it is in molten state at about 1200° C. and above although it has a reduced specific surface area.

Experiments on denitration were carried out using iron oxide pellets as the catalyst containing a multiple oxide of the CaO—$Fe_xO$ type containing ca. 15 wt % CaO. They were prepared by mixing finely divided iron ore with a CaO-containing mineral, making the mixture into pellets, and heating the pellets at about 1300° C. The experimental conditions are shown in Tables 4 and 5.

TABLE 4

| Chemical composition | Fe | 62% |
|---|---|---|
| | CaO | 4.4% |
| | $SiO_2$ | 3.0% |
| | $Al_2O_3$ | 1.4% |
| Porosity | | 27.0% |
| Diameter | | 9.2–9.8 mm |

TABLE 5

| Gas composition | For catalytic reduction | 360 ppm · NO - 5% CO - 5% $CO_2$—Ar |
|---|---|---|
| | For catalytic decomposition | 400 ppm · NO—Ar |
| Gas flow rate | | 2 N L/min |
| Weight of catalyst | | 140 g |
| Material of crucible | | 99.9% $Al_2O_3$ |

Figure 8:
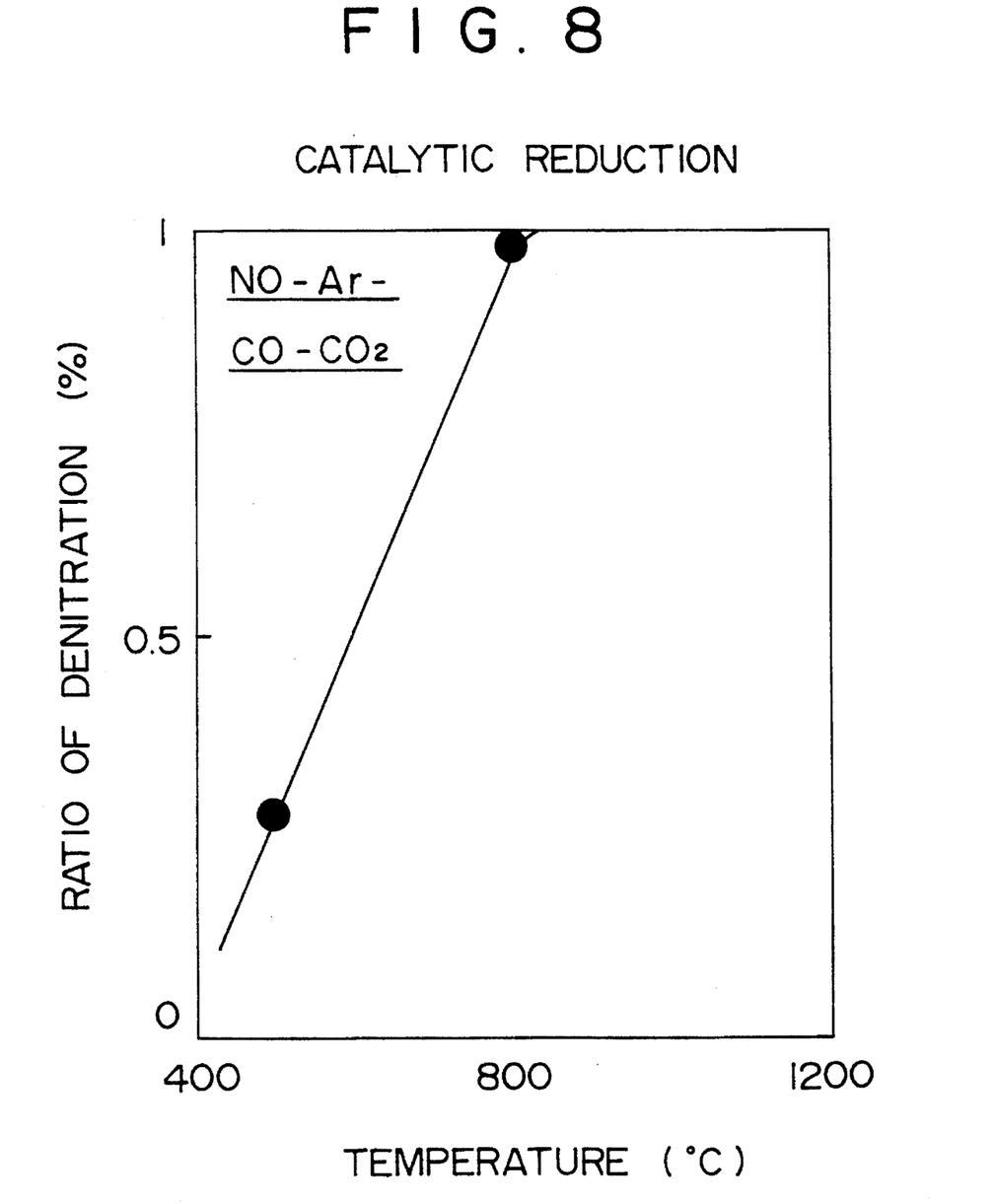
FIG. 8 is a graph showing the relationship between the reaction temperature and the ratio of denitration (in catalytic reduction).
Figure 9:
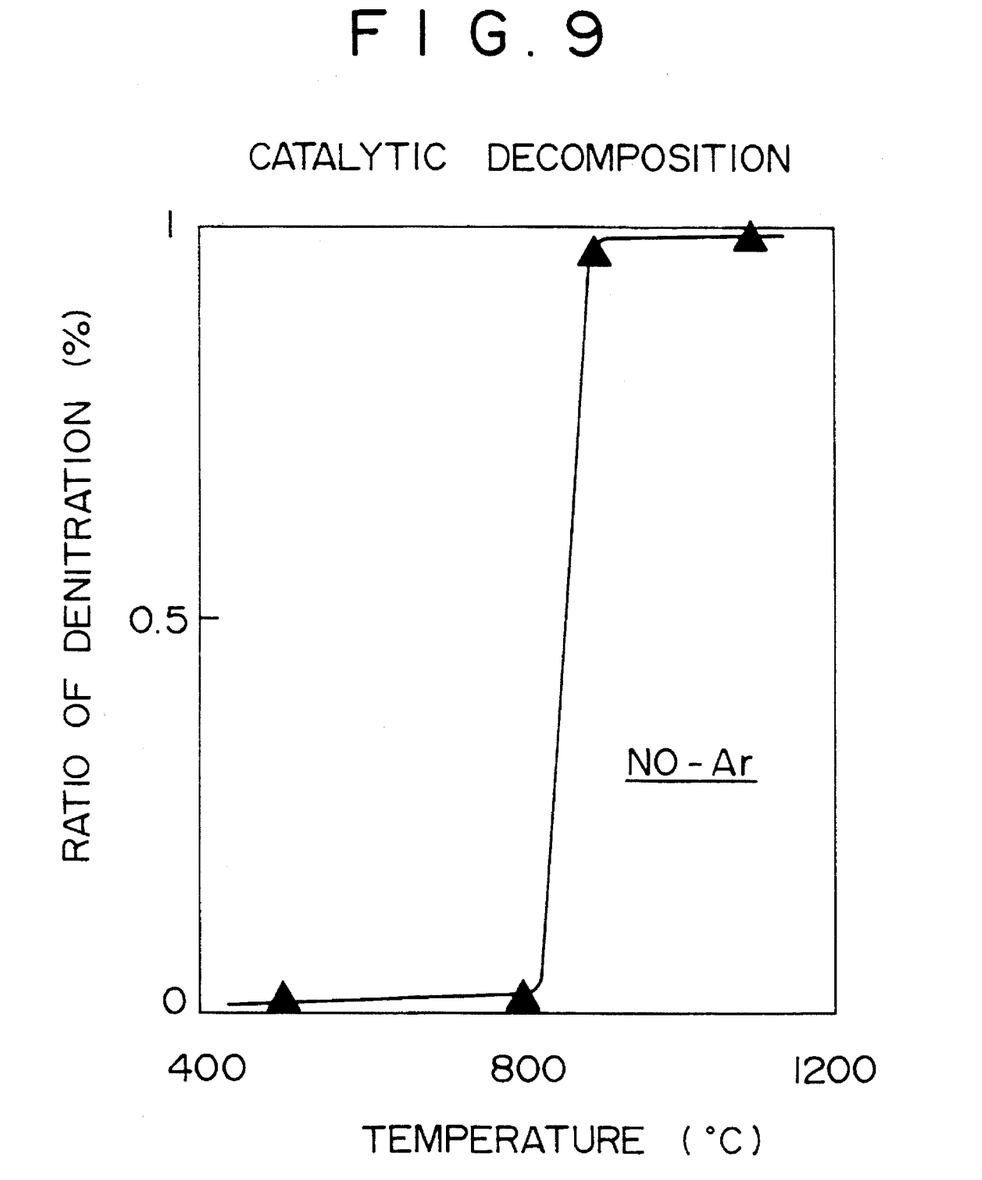
FIG. 9 is a graph showing the relationship between the reaction temperature and the ratio of denitration (in catalytic decomposition).

The results of catalytic reduction are shown in FIG. 8. It is noted that the catalyst is effective when it is above 500° C. The results of catalytic decomposition are shown in FIG. 9. It is noted that the catalyst is effective when it is above 850° C.

EXAMPLE

Since CaO—$Fe_xO$ is one of the major constituents of sintered products, it is expected that if it is fed to the bed along with the raw material for sintering, denitration will take place as soon as $NO_x$ occurs, without any adverse effect on the sintered products.

Figure 10:
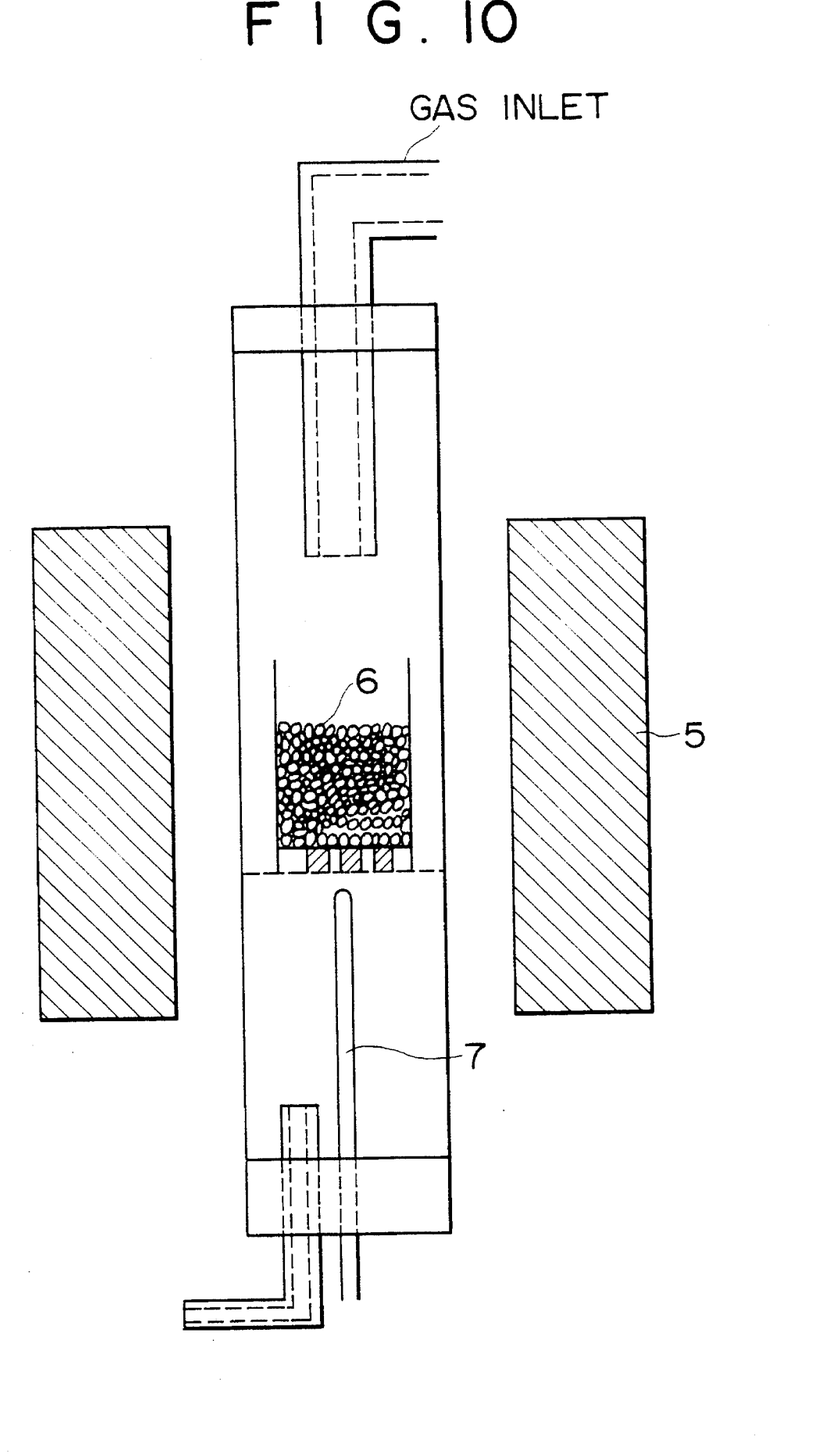
FIG. 10 is a schematic representation of the experimental apparatus simulating a sintering machine.
Figure 11:
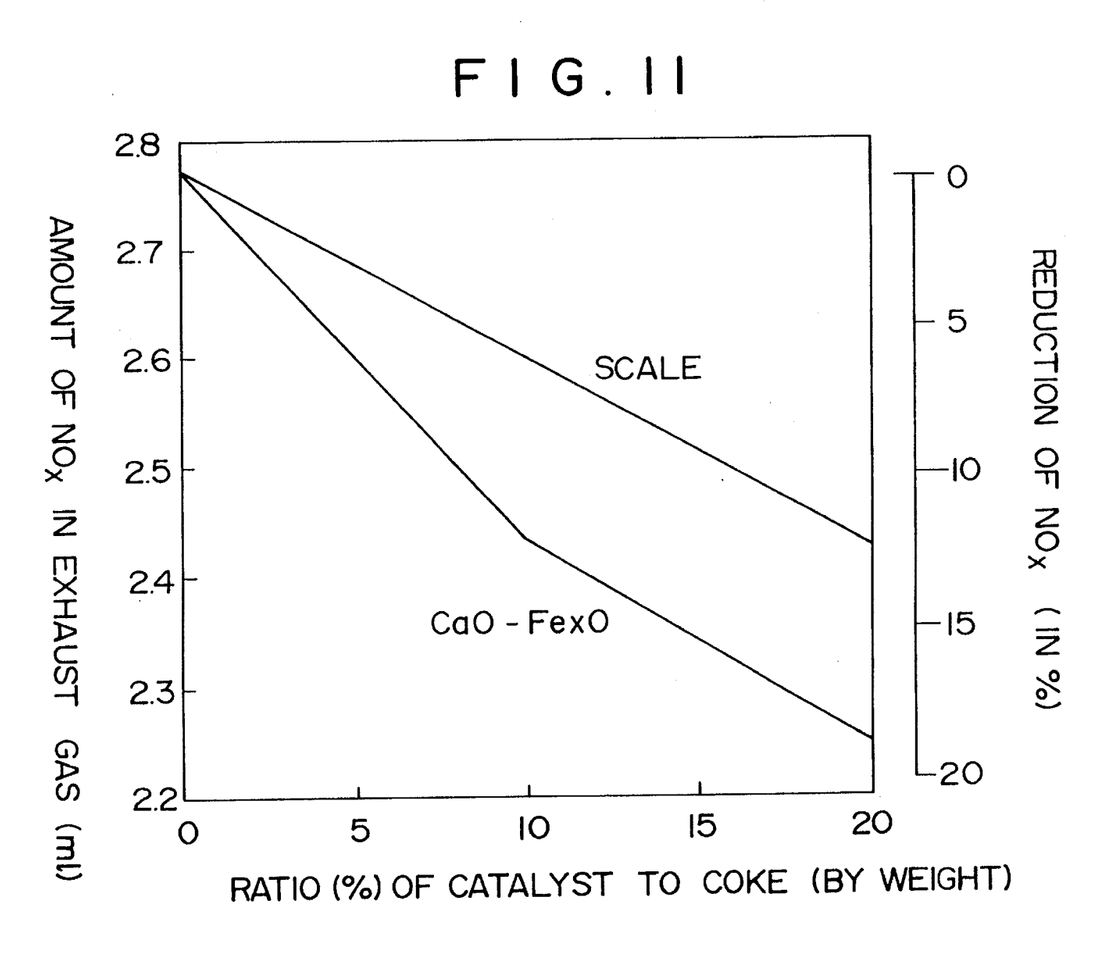
FIG. 11 is a graph showing the effect of denitration in the sintering machine model.

To simulate the combustion in a sintering machine, coke breeze (as the major fuel for a sintering machine) was burned together with CaO—$Fe_xO$ and the amount of $NO_x$ was measured, using an apparatus schematically shown in FIG. 10. The experimental conditions are shown in Tables 6 and 7. The experimental results are shown in Table 8 and FIG. 11. It is noted that CaO—$Fe_xO$ is twice as effective in denitration as scale.

TABLE 6

| Items | Description |
|---|---|
| Amount of coke | 0.5 g |
| Diameter of coke | 1–3 mm |
| Diameter of catalyst | 1–3 mm |
| Diameter of reactor tube | 50 mm |
| Preheating temperature | 800° C. |
| Gas flow rate | 2 N L/min |
| Diameter of crucible | 12 mm |
| Material of crucible | Mullite |

TABLE 7

| Sample | Composition |
|---|---|
| CaO—$Fe_xO$ | 25% CaO-75% FeO |
| Scale | By product from steel making |

TABLE 8

| Sample charged | Ratio of catalyst to coke (by weight) | Amount of $NO_x$ discharged (ml) | Undecomposed $NO_x$ in discharged gas (wt %) |
|---|---|---|---|
| Coke (control) | — | 2.77 | — |
| CaO—$Fe_xO$ | 10 | 2.44 | 11.9 |
|  | 20 | 2.25 | 18.8 |
| Scale | 10 | 2.60 | 6.1 |
|  | 20 | 2.43 | 12.3 |

EFFECT OF THE INVENTION

The present invention provides a catalyst which, on account of its constitution mentioned above, is economical materialwise and processwise and is effective in the removal of nitrogen oxides by either reduction or decomposition.

What is claimed is:

1. A process for removing nitrogen oxides comprising the step of:
   contacting exhaust gas with a CaO—$Fe_xO$ complex oxide comprising 5–50 wt.% CaO and at least 50 wt % $Fe_xO$ at a temperature greater than 500° C.

2. A process for removing nitrogen oxides as in claim 1, wherein x is 0.67 to 1.00.

3. A process for removing nitrogen oxides as in claim 1, wherein x is from 0.9 to 1.0.

4. A process for removing nitrogen oxides as in claim 1, wherein said complex oxide is in a molten state.

5. A process for removing nitrogen oxides as in claim 1, wherein said complex oxide is in lumps formed from sintering fine powder.

6. A process for removing nitrogen oxides as in claim 2, wherein said complex oxide is at a temperature greater than 800°.

7. A process for removing nitrogen oxides as in claim 3, wherein said complex oxide is at a temperature greater than 850°.

8. A process for removing nitrogen oxides as in claim 1, wherein said exhaust gas further comprises a reducing agent.

9. A process for removing nitrogen oxides as in claim 8, wherein said reducing agent is CO.

10. A process for removing nitrogen oxides as in claim 1, wherein said exhaust gas comprises CO and $CO_2$, in a ratio of $CO/CO_2$ of 0.6 or greater.

11. A process for removing nitrogen oxides as in claim 6, wherein said exhaust gas comprises CO and $CO_2$ in a ratio of $CO/CO_2$ of 0.6 or less.

* * * * *